(12) United States Patent
Redert

(10) Patent No.: US 7,787,658 B2
(45) Date of Patent: Aug. 31, 2010

(54) CREATING A DEPTH MAP

(75) Inventor: Peter-Andre Redert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 883 days.

(21) Appl. No.: 10/598,637

(22) PCT Filed: Mar. 1, 2005

(86) PCT No.: PCT/IB2005/050754

§ 371 (c)(1),
(2), (4) Date: Sep. 7, 2006

(87) PCT Pub. No.: WO2005/091221

PCT Pub. Date: Sep. 29, 2005

(65) Prior Publication Data

US 2007/0183648 A1    Aug. 9, 2007

(30) Foreign Application Priority Data

Mar. 12, 2004    (EP)    ............. 04101021

(51) Int. Cl.
*G06K 9/48*    (2006.01)
*G06T 7/00*    (2006.01)
(52) U.S. Cl. ............. 382/106; 382/154; 382/199
(58) Field of Classification Search ............. 382/106, 382/154, 199
See application file for complete search history.

(56) References Cited

U.S. PATENT DOCUMENTS

2003/0091225 A1 *    5/2003    Chen ............. 382/145

OTHER PUBLICATIONS

Narasimhamurthi et al. "Shape Determination from Intensity Images—A New Algorithm." IEEE Transactions on Circuits and Systems, vol. 37, No. 10, Oct. 1990, pp. 1248-1257.*
Vaillant et al. "Using Occluding Contours for Recovering Shape Properties of Objects." Proceedings, Workshop on Interpretation of 3D Scenes, Nov. 27, 1989, pp. 26-32.*
Barrow, H.G. et al. "Interpreting line drawings as three-dimensional surfaces"; Artificial Intelligence Netherlands, vol. 17, No. 1-3, Aug. 1981, pp. 75-116; XP002334212.
Ulupinar, F. et al. "Perception of 3-D surfaces from 2-D contours"; IEEE Transactions on Pattern Analysis and Machine Intelligence USA, vol. 15, No. 1, Jan. 1993, pp. 3-18, XP00234213.
Roussel, D. et al. "Curve and surface models to drive 3D reconstruction using stereo and shading"; 3-D Digital Imaging and Modeling, 1999 Proceedings, Second International Conferencew on Ottawa, Ont., Canada, Oct. 4-8, 1999, Los Alamitos, CA, USA, IEEE Comput. Soc., US, Oct. 4, 1999, pp. 84-90, XP010358809.

* cited by examiner

*Primary Examiner*—Jon Chang

(57) ABSTRACT

A method of generating a depth map (122) comprising depth values representing distances to a viewer, for respective pixels of an image (100), is disclosed. The method comprises: determining a contour (106) on basis of pixel values of the image (100), the contour comprising a collection of adjacent points; computing curvature vectors (108 114) at a number of the points; and assigning a first one of the depth values corresponding to the first one of the pixels on basis of the curvature vectors (108-114).

12 Claims, 6 Drawing Sheets

CREATING A DEPTH MAP

Figure 1A:
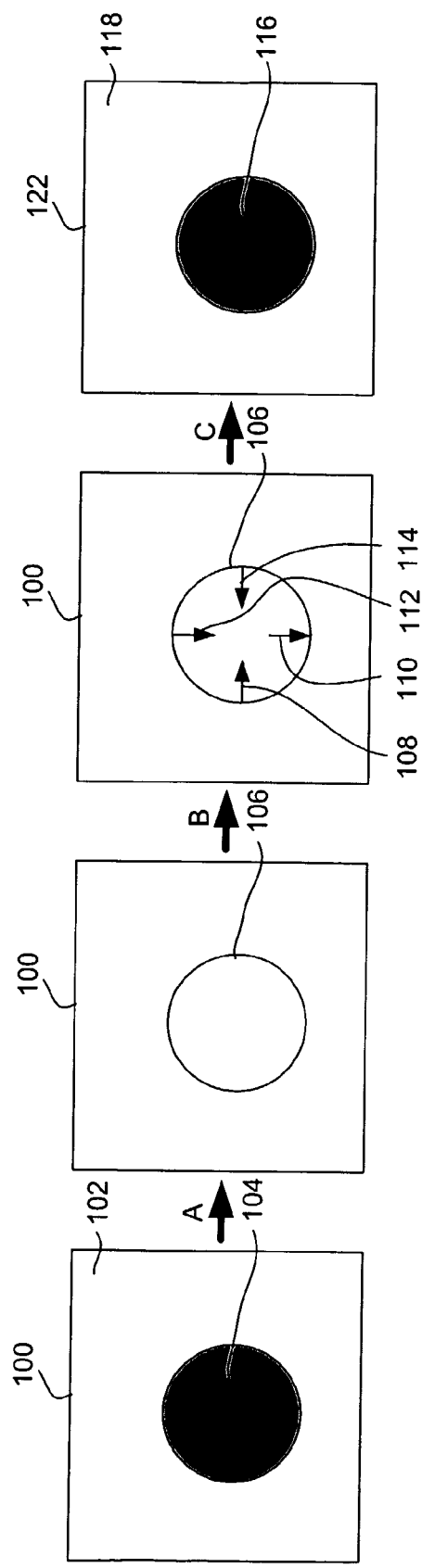

The invention relates to a method of generating a depth map comprising depth values representing distances to a viewer, for respective pixels of an image.

The invention further relates to a depth map generating unit for generating a depth map comprising depth values representing distances to a viewer, for respective pixels of an image.

The invention further relates to an image processing apparatus comprising:
  receiving means for receiving a signal corresponding to an image; and
  such a depth map generating unit for generating a depth map.

The invention further relates to a computer program product to be loaded by a computer arrangement, comprising instructions to generate a depth map comprising depth values representing distances to a viewer, for respective pixels of an image, the computer arrangement comprising processing means and a memory.

In order to generate a 3D impression on a multi-view display device, images from different virtual view points have to be rendered. This requires either multiple input views or some 3D or depth information to be present. This depth information can be either recorded, generated from multiview camera systems or generated from conventional 2D video material. For generating depth information from 2D video several types of depth cues can be applied: such as structure from motion, focus information, geometric shapes and dynamic occlusion. The aim is to generate a dense depth map, i.e. per pixel a depth value. This depth map is subsequently used in rendering a multi-view image to give the viewer a depth impression. In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed.

It is an object of the invention to provide a method of the kind described in the opening paragraph, which is based on a new depth cue.

This object of the invention is achieved in that the method comprises:
  determining a contour on basis of pixel values of the image, the contour comprising a collection of adjacent points;
  computing curvature vectors at a number of the points; and
  assigning a first one of the depth values corresponding to the first one of the pixels on basis of the curvature vectors.

The rationale behind the invention is that most objects have a sphere topology, i.e. they contain no holes, at least on a scale relevant within images. This holds for the ground, humans, telephones, cars, etc. Then, based on the curvature of the outlines of objects, the relative depth ordering can be determined. Since, visible objects will be closer to the viewer than their background. That means that pixels of an image region within a contour, i.e. corresponding to the outlines of an object, have to be assigned depth values which are lower than the pixels which are outside the contour. A relatively low depth value means that the corresponding object is relatively close to the viewer. Determining what is inside and outside a contour is based on the curvature vectors. The curvature vectors are oriented towards decreasing depth.

There are several known techniques in the field of image processing for determining contours on basis of pixel values. With pixel values is meant color and/or luminance values. Contours can e.g. be determined by means of edge detection, homogeneity calculation or based on temporal filtering. Contours can be open or closed.

Computing curvature vectors for a curve is a well-known technique in mathematics. In this case the curve is a contour. A characteristic of a curvature vector of a particular point at a curve is that its orientation is orthogonal to the local curve segment at that particular point. Another characteristic of a curvature vector of a particular point at a curve is that its length is related to the angle between a first line segment between the particular point and a neighboring point and a second line segment between the particular point and its other neighboring point.

Preferably, assigning the first one of the depth values comprises computing depth derivatives on basis of the respective curvature vectors and computing the first one of the depth values on basis of a first one of the depth derivatives. Computing depth values on basis of depth derivatives is described in International Patent Application No. WO2004/066212, entitled "Full Depth Map Acquisition", corresponding to U.S. patent application Ser. No. 10/542,137, filed Jul. 12, 2005, now U.S. patent application Publication No. 2006/0056679. For computing a first one of the depth derivatives the following applies:
  a size of a first one of the depth derivatives is computed on basis of the length of a first one of the curvature vectors; and
  a direction of a first one of the depth derivatives is computed on basis of the orientation of a first one of the curvature vectors.

Computing the other depth derivatives is based on similar rules.

An embodiment of the method according to the invention further comprises:
  computing a collection of average vectors on basis of the curvature vectors, the average vectors having mutually equal lengths; and
  assigning a first one of the depth values corresponding to the first one of the pixels on basis of the average vectors.

Figure 3:
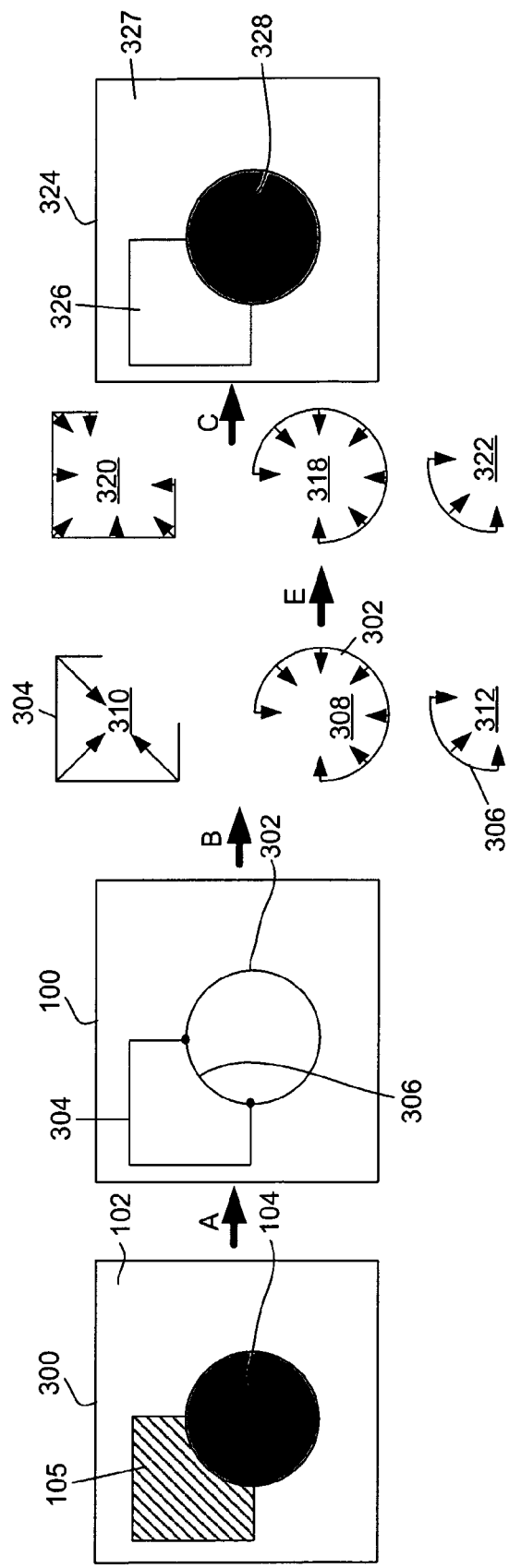

As shown in FIG. 1, a circle provides a constant curvature and thus a constant depth derivative along its boundary with respect to its surroundings. A square however, see FIG. 3 provides a very non-uniform depth derivative, being maximal in the corners, and zero everywhere else. To get mutually equal depth values for pixels which belong to the same object, some smoothing of curvature vectors is needed. That means that the curvature vectors of a contour are transformed into a new set of average vectors. Subsequently, these average vectors are applied to compute depth derivatives and subsequently depth values.

Preferably, the collection of average vectors is computed by means of parallel transport.

Preferably, assigning the first one of the depth values comprises computing depth derivatives on basis of the respective average vector and computing the first one of the depth values on basis of a first one of the depth derivatives. Then, for computing a first one of the depth derivatives the following applies:
  a size of a first one of the depth derivatives is computed on basis of the length of a first one of the average vectors; and
  a direction of a first one of the depth derivatives is computed on basis of the orientation of a first one of the average vectors.

Computing other depth derivatives is based on similar rules.

The depth value which is based on curvature vectors, optionally on basis of average vectors, can be directly used as depth value for rendering a multi-view image, e.g. as described in the cited article. Preferably, the depth value according to the invention is combined with other depth values which are based on alternative depth cues as mentioned above.

It is a further object of the invention to provide a depth map generating unit of the kind described in the opening paragraph, which is based on a new depth cue.

This object of the invention is achieved in that the generating unit comprises:
- determining means for determining a contour on basis of pixel values of the image, the contour comprising a collection of adjacent points;
- computing means for computing curvature vectors at a number of the points; and
- assigning means for assigning a first one of the depth values corresponding to the first one of the pixels on basis of the curvature vectors.

It is a further object of the invention to provide an image processing apparatus comprising a depth map generating unit of the kind described in the opening paragraph which is arranged to generate a depth map based on a new depth cue.

This object of the invention is achieved in that the generating unit comprises:
- determining means for the determining a contour on basis of pixel values of the image, the contour comprising a collection of adjacent points;
- computing means for computing curvature vectors at a number of the points; and
- assigning means for assigning a first one of the depth values corresponding to the first one of the pixels on basis of the curvature vectors.

It is a further object of the invention to provide a computer program product of the kind described in the opening paragraph, which is based on a new depth cue.

This object of the invention is achieved in that the computer program product, after being loaded, provides said processing means with the capability to carry out:
- determining a contour on basis of pixel values of the image, the contour comprising a collection of adjacent points;
- computing curvature vectors at a number of the points; and
- assigning a first one of the depth values corresponding to the first one of the pixels on basis of the curvature vectors.

Modifications of the depth map generating unit and variations thereof may correspond to modifications and variations thereof of the image processing apparatus, the method and the computer program product, being described.

Figure 1C:
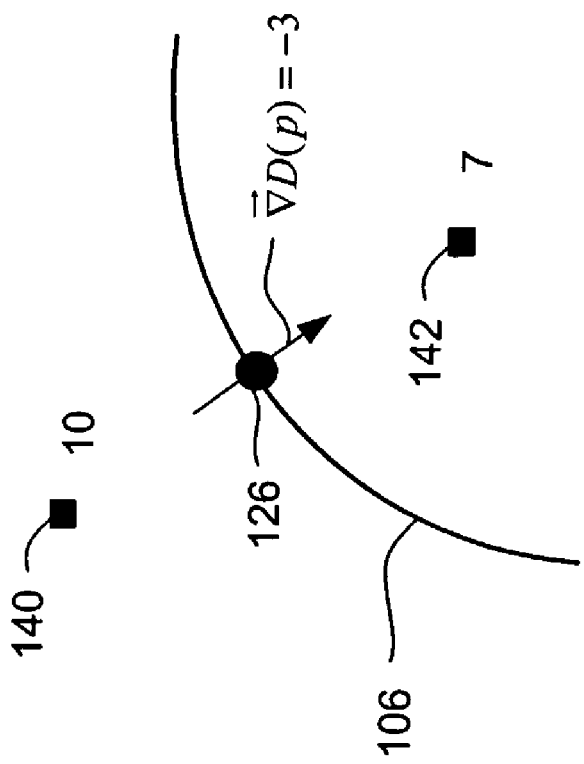
Figure 1B:
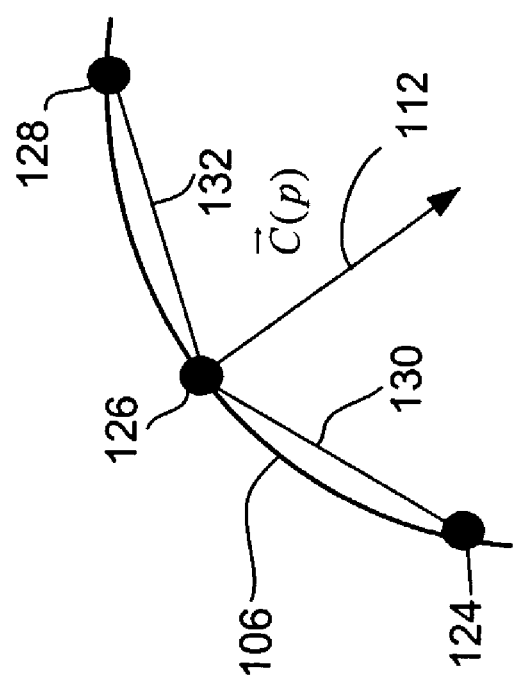
Figure 2:
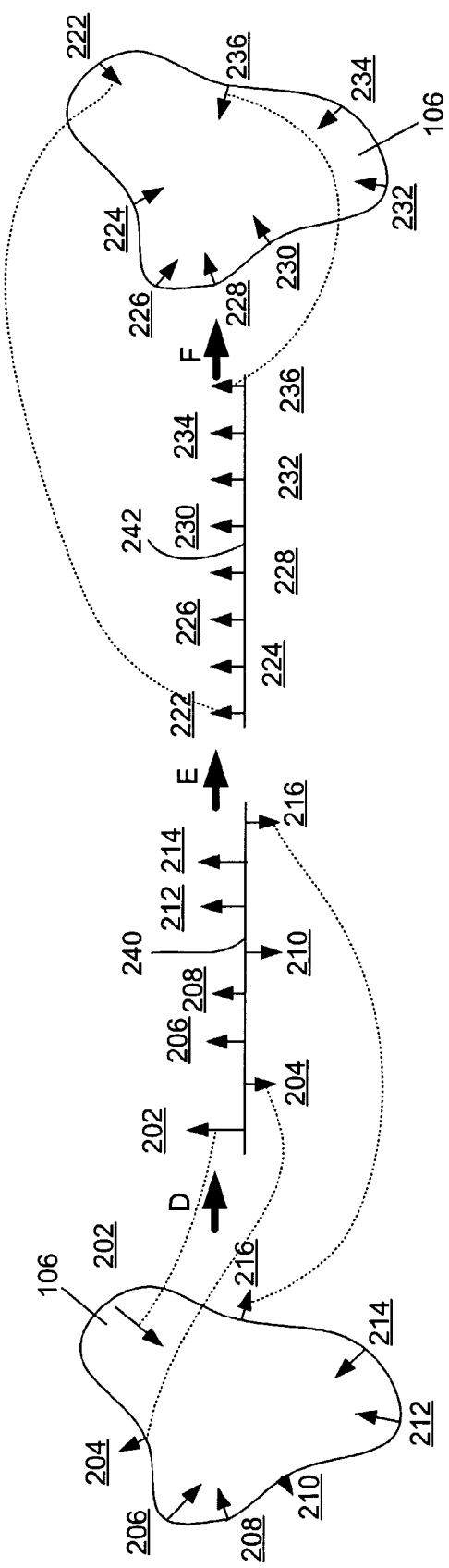
Figure 4:
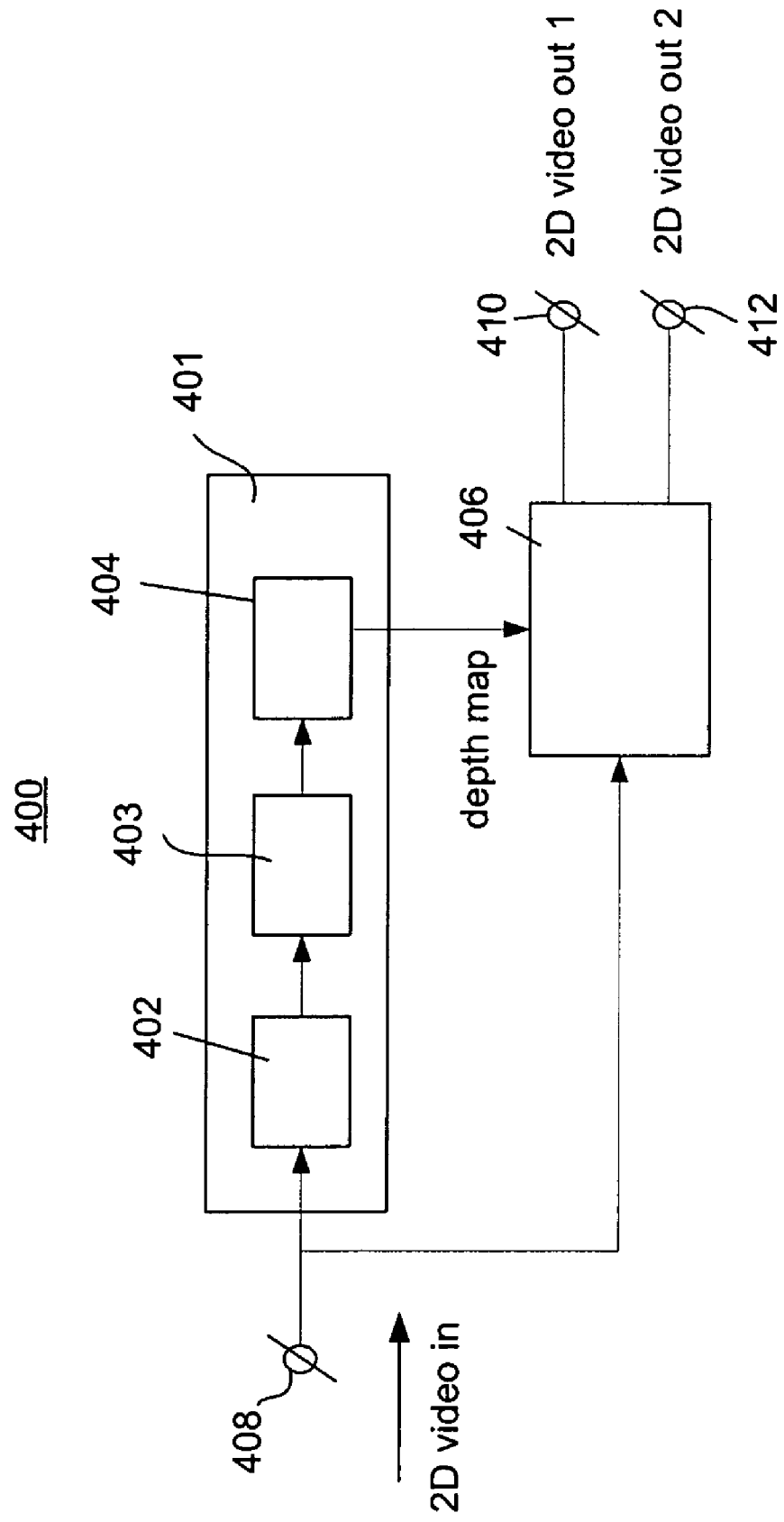
Figure 5:
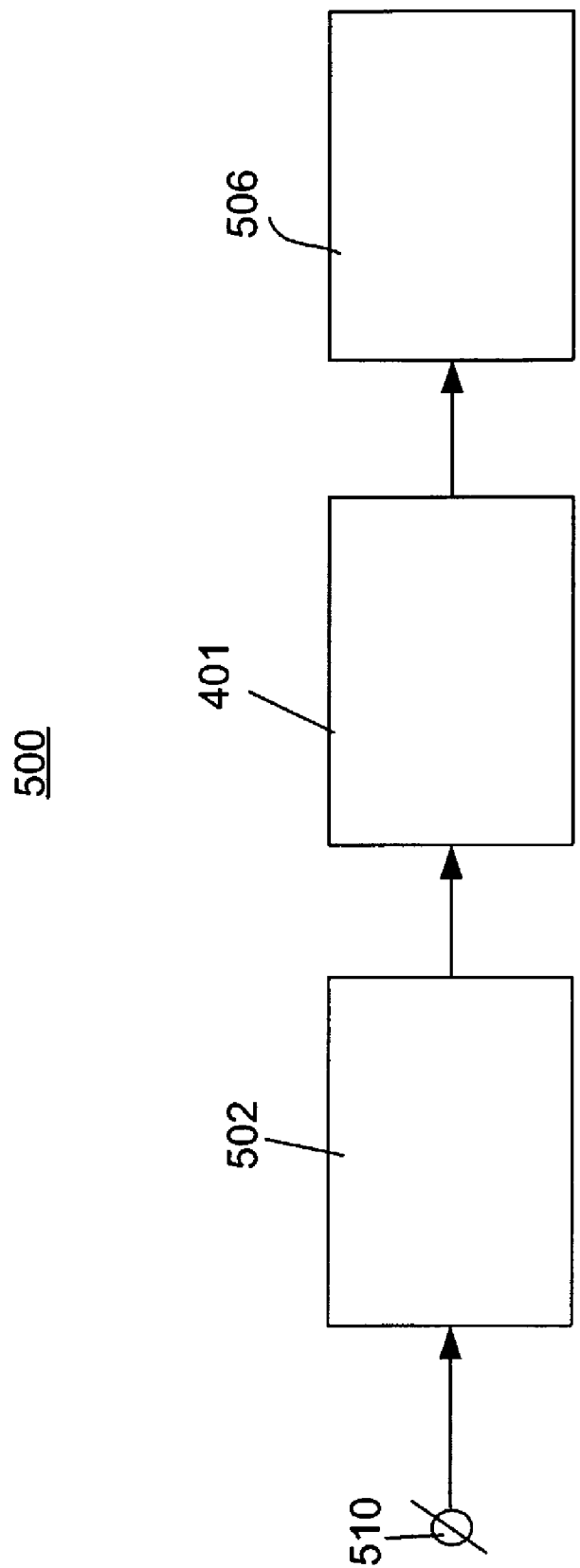

These and other aspects of the depth map generating unit, of the image processing apparatus, of the method and of the computer program product, according to the invention will become apparent from and will be elucidated with respect to the implementations and embodiments described hereinafter and with reference to the accompanying drawings, wherein:

FIG. 1A schematically shows an image and the corresponding depth map being generated with the method according to the invention;

FIG. 1B schematically shows a portion of a contour and the curvature vector;

FIG. 1C schematically shows the computation of depth values on basis of depth derivatives;

FIG. 2 schematically shows the computation of average vectors on basis of curvature vectors;

FIG. 3 schematically shows another image and the corresponding depth map being generated with the method according to the invention;

FIG. 4 schematically shows a multi-view image generation unit comprising a depth map generation unit according to the invention; and FIG. 5 schematically shows an embodiment of the image processing apparatus according to the invention.

Same reference numerals are used to denote similar parts throughout the figures.

FIG. 1A schematically shows an image 100 and the corresponding depth map 122 being generated with the method according to the invention. FIG. 1 shows an image 100 representing a first object 104 and a second object 102 which is located behind the first object 104. It should be noted that the background can form one or more objects, e.g. the sky or a forest or a meadow.

FIG. 1A shows a depth map 122 comprising a first group 116 of depth values corresponding to the first object 104 and comprises a second group 118 of depth values corresponding to the second object 102. The depth values of the first group 116 of depth values are lower than the depth values of the second group 118 of depth values, meaning that the first object 104 is more close to a viewer of the image 100 or to a multi-view image which is based on the image 100, than the second object 102.

The depth map 122 is generated on basis of the method according to the invention. For the generation of depth values the following steps are performed:

A: a contour 106 is determined on basis of pixel values of the image 100. In this case, the contour 106 corresponds to the edge of the first object 104. The contour is found by means of edge detection. The contour 106 comprises a collection of adjacent points. These adjacent points can correspond with the pixel coordinates. Alternatively these points are expressed in floating points related to the pixel matrix of the image 100;

B: curvature vectors 108-114 are computed for a number of the points of the collection. Typically, a particular curvature vector 112 is computed for a particular point 126 on basis of the coordinates of the particular point 126 and the respective coordinates of the neighboring points 124 and 128. See the description in connection with FIG. 1B.

C: depth derivatives are computed on basis of the curvature vectors 108-114. The value of the depth derivatives is related to the length of the respective curvature vectors and the direction of the depth derivatives is based on the orientation of the respective curvature vectors. In Equation 1 is specified how a depth derivative $\vec{\nabla}D(p)$ for a point p is computed on basis of the corresponding curvature vector $\vec{C}(p)$ for the point p. The value α is a constant.

$$\vec{\nabla}D(p) = -\alpha \vec{C}(p) \qquad (1)$$

See the description in connection with FIG. 1C for the computation of depth values on basis of depth derivatives.

FIG. 1B schematically shows a portion of a contour 106 and the particular curvature vector 112 which belongs to this portion of the contour 106. The contour 106 comprises a collection of adjacent points of which three points 124, 126, 128 are depicted in FIG. 1B. The orientation of the particular curvature 112 is orthogonal to the portion of the contour at the particular point 126. Another characteristic of the particular curvature vector 112 of the particular point 126 is that its length is related to the angle between a first line segment 130 between the particular point 126 and a neighboring point 124 and a second line segment 132 between the particular point 126 and its other neighboring point 128.

FIG. 1C schematically shows the computation of depth values on basis of depth derivatives, in particular the computation of a first depth value corresponding to a first pixel 142 on basis of a particular depth derivative $\vec{\nabla}D(p)$ which has been determined for a particular point p 126 on basis of the corresponding curvature vector $\vec{C}(p)$ for the point p 126. This depth value computation is conform with what is disclosed in the patent application with filing number EP 03100092.0. The value of the particular depth derivative $\vec{\nabla}D(p)=-3$, i.e. length 3 and having a direction opposite to the curvature vector. For an origin pixel 140 the depth value has been set to a well chosen predetermined offset depth value which in this case is equal to 10. The computation of the first depth value corresponding to the first pixel 142 is relatively easy then, i.e. 10−3=7.

FIG. 2 schematically shows the computation of average vectors 222-236 on basis of curvature vectors 202-216. This computation is based on so-called parallel transport of vectors along a curve. The computation comprises the following steps:

D: contour 106 is unwind into a straight line 208. While unwinding, the length of the curvature vectors 202-216 and their direction with respect to the contour 106 are maintained. By definition, the unwound curvature vectors point either up or down. That means that each of them can be represented by means of a real number.

E: then the unwound curvature vectors, i.e. real numbers are accumulated and optionally divided by the number of curvature vectors or by a predetermined constant value (e.g. 2π), resulting into average vectors 222-236.

F: then the original curvature vectors 202-216 are replaced by the average vectors 222-236. The average vectors 202-216 have the following characteristics:
   they all have the same length;
   each of them is oriented orthogonal to its local curve segment;
   each of them is oriented parallel to its corresponding original curvature vector.

That means that it either directs in the same direction or in the opposite direction.

FIG. 3 schematically shows another image 300 and the corresponding depth map 324 being generated with the method according to the invention. FIG. 3 shows an image 300 representing a first object 104, i.e. a round object, a third object object 105, i.e. a square object, which is located behind the first object 104 and a second object 102, i.e. the background which is located behind the third object 105.

FIG. 3 shows a depth map 324 comprising a first group 328 of depth values corresponding to the first object 104 and comprises a second group 327 of depth values corresponding to the second object 102. The depth map 324 further comprises a third group 326 of depth values corresponding to the third object 105. The depth values of the first group 328 of depth values are lower than the depth values of the second group 327 of depth values, meaning that the first object 104 is more close to a viewer of the image 300 or to a multi-view image which is based on the 300, than the second object 102.

The depth map 324 is generated on basis of the method according to the invention. For the generation of depth values the following steps are performed:

A: the three open contours 302-306 are determined on basis of pixel values of the image 300. In this case, the first contour 302 corresponds to a portion of the edge of the first object 104, the second contour 304 corresponds to a portion of the edges of the third object 105 and the third contour 306 corresponds to another portion of the edge of the first object. These three open contours 302-306 are determined on basis of edge detection followed by detection of T-junctions.

B: then sets of curvature vectors 308-312 are computed for the respective open contours 302-306. As can be seen, the curvature vectors 310 corresponding to the second contour 304 are relatively high.

E: then sets of average vectors 318-322 are computed for the respective sets of curvature vectors 308-312 as described in connection with FIG. 2;

C: then depth derivatives are computed on basis of the average vectors 318-322. The value of the depth derivatives is related to the length of the respective average vectors and the direction of the depth derivatives is based on the orientation of the respective average vectors. The depth values are computed on basis of the depth derivatives as disclosed in the patent application with filing number EP 03100092.0. In Equation 2 is specified how a depth derivative $\vec{\nabla}D(p)$ for a point p is computed on basis of the corresponding average vector $\vec{C}_{average}(p)$ for the point p. The value α is a constant.

$$\vec{\nabla}D(p) = -\alpha \vec{C}_{average}(p) \qquad (2)$$

FIG. 4 schematically shows a multi-view image generation unit 400 comprising a depth map generation unit 401 according to the invention. The multi-view image generation unit 400 is arranged to generate a sequence of multi-view images on basis of a sequence of video images. The multi-view image generation unit 400 is provided with a stream of video images at the input connector 408 and provides two correlated streams of video images at the output connectors 410 and 412, respectively. These two correlated streams of video images are to be provided to a multi-view display device which is arranged to visualize a first series of views on basis of the first one of the correlated streams of video images and to visualize a second series of views on basis of the second one of the correlated streams of video images. If a user, i.e. viewer, observes the first series of views by his left eye and the second series of views by his right eye he notices a 3D impression. It might be that the first one of the correlated streams of video images corresponds to the sequence of video images as received and that the second one of the correlated streams of video images is rendered on basis of the sequence of video images as received. Preferably, both streams of video images are rendered on basis of the sequence of video images image as received. The rendering is e.g. as described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. Alternatively, the rendering is as described in "High-quality images from 2.5D video", by R. P. Berretty and F. E. Ernst, in Proceedings Eurographics, Granada, 2003, Short Note 124.

The multi-view image generation unit 400 comprises:
   a depth map generation unit 401 for generating depth maps for the respective input images on basis of the transitions in the image; and a rendering unit 406 for rendering the multi-view images on basis of the input images and the respective depth maps, which are provided by the depth map generation unit 401.

The depth map generating unit 401 for generating depth maps comprising depth values representing distances to a viewer, for respective pixels of the images, comprises:

a determining unit 402 for the determining a contour on basis of pixel values of the image 100, the contour comprising a collection of adjacent points;

computing unit 403 for computing curvature vectors at a number of the points; and an assigning unit 404 for assigning a first one of the depth values corresponding to the first one of the pixels on basis of the curvature vectors 108-114.

The determining unit 402, the computing unit 403, the assigning unit 404 and the rendering unit 406 may be implemented using one processor. Normally, these functions are performed under control of a software program product. During execution, normally the software program product is loaded into a memory, like a RAM, and executed from there. The program may be loaded from a background memory in the form of a computer-readable storage medium, like a ROM, hard disk, or magnetically and/or optical storage, or may be loaded via a network like Internet. Optionally an application specific integrated circuit provides the disclosed functionality.

It should be noted that, although the multi-view image generation unit 400 as described in connection with FIG. 4 is designed to deal with video images, alternative embodiments of the depth map generation unit according to the invention are arranged to generate depth maps on basis of individual images, i.e. still pictures.

FIG. 5 schematically shows an embodiment of the image processing apparatus 500 according to the invention, comprising:

a receiving unit 502 for receiving a video signal representing input images;

a multi-view image generation unit 401 for generating multi-view images on basis of the received input images, as described in connection with FIG. 4; and a multi-view display device 506 for displaying the multi-view images as provided by the multi-view image generation unit 401.

The video signal may be a broadcast signal received via an antenna or cable but may also be a signal from a storage device like a VCR (Video Cassette Recorder) or Digital Versatile Disk (DVD). The signal is provided at the input connector 510. The image processing apparatus 500 might e.g. be a TV. Alternatively the image processing apparatus 500 does not comprise the optional display device but provides the output images to an apparatus that does comprise a display device 506. Then the image processing apparatus 500 might be e.g. a set top box, a satellite-tuner, a VCR player, a DVD player or recorder. Optionally the image processing apparatus 500 comprises storage means, like a hard-disk or means for storage on removable media, e.g. optical disks. The image processing apparatus 500 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, etcetera do not indicate any ordering. These words are to be interpreted as names.

The invention claimed is:

1. A method of generating a depth map comprising depth values representing distances to a viewer, for respective pixels of an image, the method comprising the steps of:

determining a contour, using a determining unit, on the basis of pixel values of the image, the contour comprising a collection of adjacent points;

computing curvature vectors, using a computing unit, at a number of the points; and assigning, using an assigning unit, a first one of the depth values corresponding to the first one of the pixels on the basis of the curvature vectors.

2. The method of generating a depth map as claimed in claim 1, wherein the step of assigning the first one of the depth values comprises the sub-steps:

computing depth derivatives on the basis of the respective curvature vectors; and computing the first one of the depth values on the basis of a first one of the depth derivatives.

3. The method of generating a depth map as claimed in claim 2, wherein a size of a first one of the depth derivatives is computed on the basis of the length of a first one of the curvature vectors.

4. The method of generating a depth map as claimed in claim 2, wherein a direction of a first one of the depth derivatives is computed on the basis of the orientation of a first one of the curvature vectors.

5. The method of generating a depth map as claimed in claim 1, wherein the method further comprises the steps of:

computing a collection of average vectors on the basis of the curvature vectors, the average vectors having mutually equal lengths; and assigning a first one of the depth values corresponding to the first one of the pixels on the basis of the average vectors.

6. The method of generating a depth map as claimed in claim 5, wherein the collection of average vectors is computed by means of parallel transport.

7. The method of generating a depth map as claimed in claim 5, wherein assigning the first one of the depth values comprises computing depth derivatives on the basis of the respective average vector, and computing the first one of the depth values on the basis of a first one of the depth derivatives.

8. The method of generating a depth map as claimed in claim 7, wherein a size of a first one of the depth derivatives is computed on the basis of the length of a first one of the average vectors.

9. The method of generating a depth map as claimed in claim 7, wherein a direction of a first one of the depth derivatives is computed on the basis of the orientation of a first one of the average vectors.

10. A depth map generating unit for generating a depth map comprising depth values representing distances to a viewer, for respective pixels of an image, the depth map generating unit comprising:

determining means for determining a contour on the basis of pixel values of the image, the contour comprising a collection of adjacent points;

computing means for computing curvature vectors at a number of the points; and assigning means for assigning a first one of the depth values corresponding to the first one of the pixels on the basis of the curvature vectors.

11. An image processing apparatus comprising:

receiving means for receiving a signal corresponding to an image; and a depth map generating unit, as claimed in claim 10, coupled to the receiving means for generating a depth map.

12. A computer-readable storage medium having stored thereon a computer program comprising instructions for causing a computer to generate a depth map comprising depth values representing distances to a viewer, for respective pixels of an image, the computer arrangement comprising processing means for performing, under control of the computer program, the steps of:

determining a contour on the basis of pixel values of the image, the contour comprising a collection of adjacent points;

computing curvature vectors at a number of the points; and assigning a first one of the depth values corresponding to the first one of the pixels on the basis of the curvature vectors.

* * * * *